United States Patent
Ma et al.

(10) Patent No.: US 8,010,099 B2
(45) Date of Patent: Aug. 30, 2011

(54) METHODS OF RECONFIGURING SECTOR COVERAGE IN IN-BUILDING COMMUNICATIONS SYSTEM

(75) Inventors: Zhengxiang Ma, Summit, NJ (US); Alistair Urie, Issy-les-Moulineaux (FR)

(73) Assignee: Alcatel Lucent, Paris (FR)

( * ) Notice: Subject to any disclaimer, the term of this patent is extended or adjusted under 35 U.S.C. 154(b) by 1029 days.

(21) Appl. No.: 11/896,558

(22) Filed: Sep. 4, 2007

(65) Prior Publication Data
US 2009/0061771 A1    Mar. 5, 2009

(51) Int. Cl.
*H04W 4/00* (2009.01)

(52) U.S. Cl. .......... 455/422.1; 455/432.1; 455/436; 455/440; 455/442; 455/444; 455/455; 370/331

(58) Field of Classification Search .......... 455/422.1, 455/432.1, 435.1, 436–444; 370/331–334
See application file for complete search history.

(56) References Cited

U.S. PATENT DOCUMENTS

| | | | |
|---|---|---|---|
| 6,636,737 B1 * | 10/2003 | Hills et al. | 455/450 |
| 6,681,115 B1 * | 1/2004 | McKenna et al. | 455/517 |
| 6,968,187 B1 * | 11/2005 | Irwin et al. | 455/431 |
| 7,162,250 B2 * | 1/2007 | Misra | 455/453 |
| 2005/0157675 A1 | 7/2005 | Feder et al. | |
| 2006/0209752 A1 | 9/2006 | Wijngaarden et al. | |
| 2008/0014941 A1 | 1/2008 | Catovic et al. | |

FOREIGN PATENT DOCUMENTS

| | | |
|---|---|---|
| EP | 1 207 711 | 5/2002 |
| EP | 1 804 398 | 7/2007 |
| GB | 2 311 191 | 9/1997 |
| WO | WO 01/80500 | 10/2001 |

OTHER PUBLICATIONS

International Search Report dated Dec. 10, 2009.
Written Opinion dated Dec. 10, 2009.

* cited by examiner

*Primary Examiner* — Stephen M D'Agosta
(74) *Attorney, Agent, or Firm* — Harness, Dickey & Pierce (57) ABSTRACT

In an in-building wireless communications network, a weighted sum of a downlink signal from two relevant base station interfaces (BSIs) is transmitted by a radio transceiver transitioning between two sectors. During a transition period, the weight of the combined downlink signal is adjusted gradually to simulate a smooth shift in the coverage of the sectors and transition the radio transceiver from a first sector to a second sector. This allows a base station to hand over users from a first sector to a second sector while suppressing any disruption in service.

13 Claims, 6 Drawing Sheets

METHODS OF RECONFIGURING SECTOR COVERAGE IN IN-BUILDING COMMUNICATIONS SYSTEM

BACKGROUND

Conventionally, signal quality between a base transceiver station and a mobile unit may degrade under certain conditions. For example, when a user moves from an outside location to an indoor location (e.g., a building), wireless signal strength may degrade significantly because radio signals must pass through or around various obstructions (e.g., walls, ceilings, etc.). U.S. patent application Ser. Nos. 10/884,203 to Feder et al. and 11/435,665 to Wijngaarden et al. discuss methods and apparatuses for introducing cellular or other wireless signals/messages into a building or other location by transmitting data packets corresponding to those signals over a high-speed data network.

Figure 1:
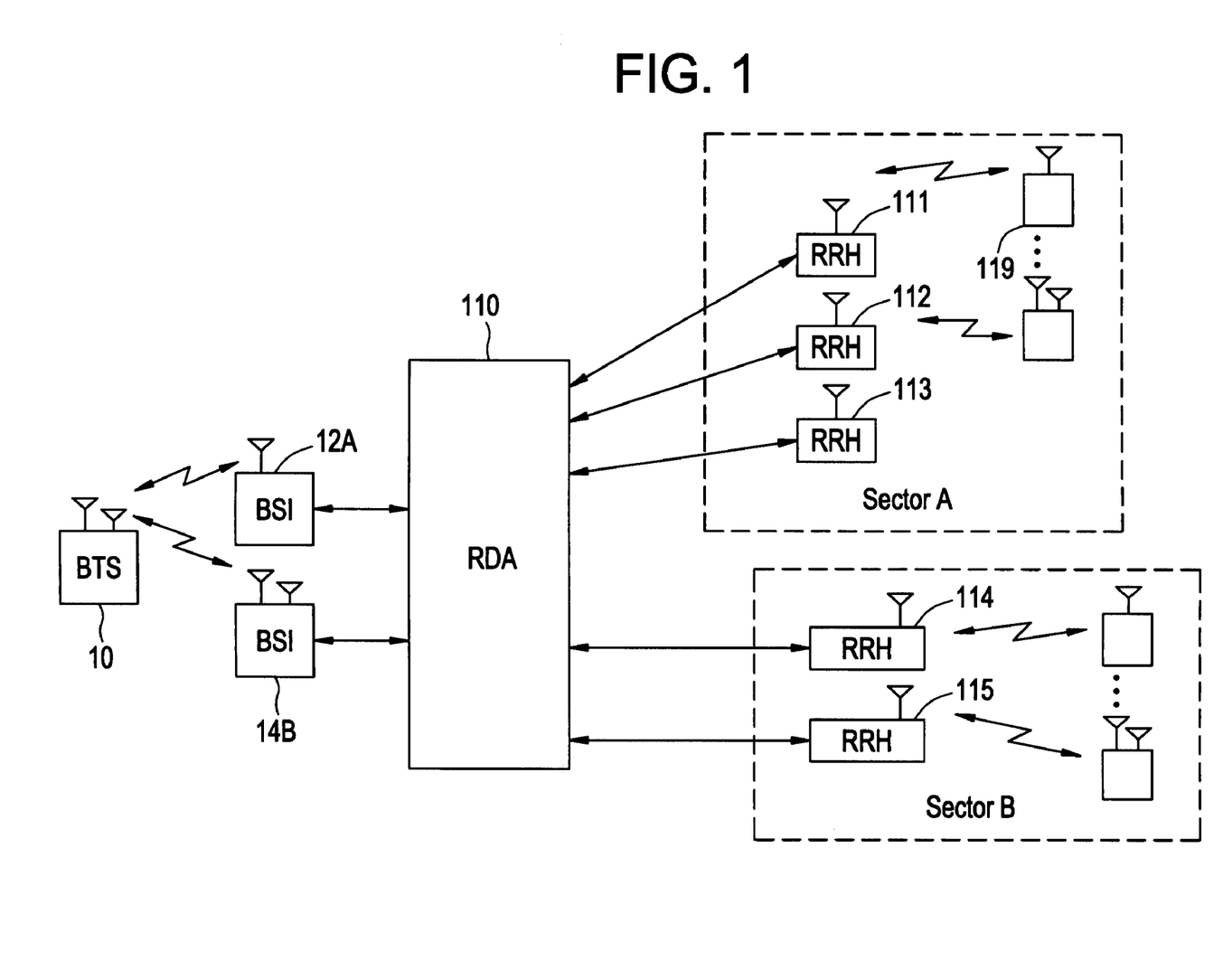
FIG. 1 shows a conventional in-building communications network.

FIG. 1 shows a conventional in-building communications network such as those described in U.S. patent application Ser. Nos. 10/884,203 and 11/435,665. In the network of FIG. 1, the base station interfaces (BSIs) 12A, 14B, radio distributor/aggregator (RDA) 110, remote radio heads (RRHs) 111-115 and a plurality of mobile units (including mobile unit 119) may be located in a building. A base transceiver station (BTS) 100 may be geographically separated from these in-building network components.

Referring to FIG. 1, in the downlink (e.g., from BTS 10 to mobile unit 119) wireless signals are received at BSI 12A from the BTS 10. The BSI 12A processes the wireless signals to generate a mobile user-coded baseband signal (hereinafter a data signal) and stores the generated data signal in a buffer (not shown). Once the buffer reaches a given threshold level, or a given amount of time has passed, the BSI 12A packetizes (e.g., into one or more Ethernet packets) the data signal to generate data packets (or data packet stream) including a destination address (e.g., a MAC address) corresponding to one or more RRHs (e.g., RRHs 111-113 corresponding to sector A). The BSI 12A forwards the data packets over a high-speed data network, such as a gigabit Ethernet network, to the RDA 110.

As is well-known, the RDA 110 serves as a network switch having a plurality of ports. Each port on the RDA 110 may correspond to one or more addressable sectors for routing data packets between BSIs 12A and 14B and RRHs 111-115. One or more RRHs may belong to a particular sector. With regard to FIG. 1, for example, RRHs 111-113 belong to sector A, whereas RRHs 114 and 115 belong to sector B. Each RRH corresponds to and provides an area of wireless coverage within a building.

Still referring to FIG. 1, the RDA 110 receives the data packets from the BSI 12A having addresses corresponding to sector A and identifies which ports on the RDA 110 are associated with RRHs in sector A. In one example, the RDA 110 identifies these ports by comparing the received addresses with entries in a look-up table. This well-known look-up procedure may use a variety of existing Ethernet protocols, such as using special multicast addresses, or having all RRHs belonging to a particular sector be a part of the same virtual LAN (VLAN), and broadcasting packets on that VLAN.

Once the RDA 110 has identified the ports corresponding to sector A, the RDA 110 replicates the data packets (if necessary) and forwards a copy of each data packet to the appropriate RRHs 111-113. In this example, the RDA 110 replicates and sends the received data packets to RRHs 111-113 serving mobile unit 119.

As is well-known, each RRH 111-115 includes network interface equipment, timing and frequency synchronization equipment, signal processing elements, a power amplifier and one or more antennas. The network interface equipment of the destination RRH (e.g., RRHs 111-113) receives and buffers the data packets from the RDA 110, removes the packet header and processes the data packets to recover the data signal.

The data signal is buffered, processed, converted to RF signals, amplified and broadcast over the air via the antenna(s) as is well-known in the art.

Still referring to FIG. 1, in the uplink, mobile units in sector A transmit wireless signals to RRHs 111-113. Each of RRHs 111-113 process the received wireless signals in the same manner as the BSI 12A processes the downlink wireless signals to generate data signals. Each of the RRHs 111-113 also buffers and then packetizes the generated data signals in the same manner as at the BSI 12A to generate a plurality of data packets. The RRHs 111-113 transmit the uplink data packets to the RDA 110 via the high-speed data network.

The RDA 110 buffers and processes the data packets to recover the uplink data signals and combines the data signals from each of RRHs 111-113 to generate a resultant uplink data signal. The resultant uplink data signal is re-packetized and forwarded to BSI 12A.

The BSI 12A processes the received data packets to recover the resultant uplink data signal and further processes the data signal to generate wireless signals for transmission to the BTS 10.

As discussed above, RRHs may be grouped into sectors. The RRHs within each sector may simulcast the same downlink signal, and the uplink signals received from each RRH may be combined together to form a single uplink signal for transmission to BTS 10. Conventionally, sectors within a building may be changed using software configurations. In certain situations, it may be desirable to dynamically change the coverage of different sectors to match the changing user traffic density.

For example, when a hot spot develops over a certain area covered by a group of RRHs belonging to a single sector, some of the RRHs in the group may be reconfigured to join another sector to shed the traffic load into that sector. However, if the reconfiguration is performed suddenly, the users served by the RRHs switching sectors, may experience disruption in service.

SUMMARY

Example embodiments provide methods for more smoothly reconfiguring sectors in an in-building communications network.

In one example embodiment, remote radio heads (RRHs) may be configured to transmit a weighted sum of downlink data signals from two relevant base station interfaces (BSIs). In at least this example embodiment, during a transition period the weight of the combined downlink data signal may be adjusted gradually to simulate a smooth shift in the coverage of the sectors. This may allow a base transceiver station to hand over users from a first sector to a second sector, while suppressing any disruption in service.

According to example embodiments, during the transition period, one or more remote radio heads (RRHs) transitioning from the first sector to the second sector may be assigned to virtual local area networks (VLANs) of each of the sectors. As a result, the transitioning RRHs may receive downlink broadcast signals from both sectors, and the weighted summing may be performed locally within the RRHs. Alternatively, the weighted summing may be performed within the radio distributor/aggregator (RDA) or switch. In addition, if the BSI for each sector is physically integrated on the same circuit board, the weighted summing may be performed at the BSIs. In this example embodiment, a new virtual LAN may be created to carry the resultant combined signal and the transitioning radio heads may be assigned to the new virtual LAN to receive the new signal.

According to another example embodiment, in the uplink, during the transition period signals from transitioning RRHs may be combined into a resultant uplink signal for each sector. The resultant signal may be a weighted sum of uplink data signals from mobile units being served by the transitioning RRHs and the RRHs in each of the first sector and the second sector. The weights of the weighted sum may be adjusted gradually to simulate a relatively smooth shift in the uplink coverage of the two sectors.

In a method according to an example embodiment, at least one in-building radio transceiver may transition from a first sector to a second sector. The transitioning step may be performed during a transition period in which the at least one radio transceiver transmits a weighted sum of a first data signal and a second data signal. The first data signal may be associated with the first sector and the second data signal may be associated with the second sector. The weighted sum may vary such that, during the transition period, the first data signal decreases in signal strength and the second data signal increases in signal strength.

In another example embodiment of a method, at least one radio transceiver may transmit a weighted sum of a first data signal and a second data signal. The first data signal may be associated with a first sector of a wireless network and the second data signal may be associated with a second sector of a wireless. The weighted sum may vary such that, during a transition period, the first data signal decreases in signal strength and the second data signal increases in signal strength.

In a method according to another example embodiment, a first weight adjusted data signal associated with a transitioning radio transceiver may be combined with a first data signal associated with a first radio transceiver to generate a resultant weighted signal. The first weight adjusted signal may be adjusted with a first weight, the first weight gradually decreasing during a transition period. A second weight adjusted data signal associated with the transitioning radio transceiver may be combined with a second data signal associated with a second radio transceiver to generate a second resultant weighted signal. The second weight adjusted signal may be adjusted a second weight. The second weight may gradually increasing during the transition period. The first and second resultant weighted signals may be transmitted until the transitioning radio transceiver transitions from the first sector to the second sector.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments will be described with regard to the structure of the communications network shown in FIG. 2. However, example embodiments may be applicable to other communications networks. Where used below, the term "mobile unit" may be considered synonymous to user, mobile station, mobile, mobile user, user equipment (UE), subscriber, remote station, access terminal, receiver, etc., and may describe a portable, wireless communication device. The term "base station" may be considered synonymous to base transceiver station (BTS), NodeB, and may describe equipment that provides data and/or voice connectivity between a network and one or more users.

Example embodiments are discussed herein as being implemented in a suitable computing environment. Although not required, example embodiments will be described in the general context of computer-executable instructions, such as program modules, being executed by one or more computer processors or CPUs. Generally, program modules include routines, programs, objects, components, data structures, etc. that perform particular tasks or implement particular abstract data types. The program modules discussed herein may be implemented using existing hardware in existing communication networks.

Example embodiments may also be practiced in distributed computing environments where tasks are performed by remote processing devices that are linked through a communications network. In a distributed computing environment, program modules may be located in both local and remote memory storage devices.

In the following description, example embodiments will be described with reference to acts and symbolic representations of operations that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

The data structures where data is maintained are physical locations of the memory that have particular properties defined by the format of the data. However, while example embodiments are described in the foregoing context, it is not meant to be limiting as those of skill in the art will appreciate that various acts and operations described hereinafter may also be implemented in hardware.

As discussed above, in certain situations, it may be desirable to dynamically change the coverage of different sectors of an in-building communication system to match changing user traffic density. For example, when a hot spot develops over a certain area covered by a group of RRHs belonging to a single sector, some of the RRHs in the group may be reconfigured to join another sector to more evenly distribute the traffic load between sectors. Using example embodiments, sectors of an in-building communications network may be re-configured more smoothly by transitioning one or more RRHs between a first sector and a second sector.

Figure 2:
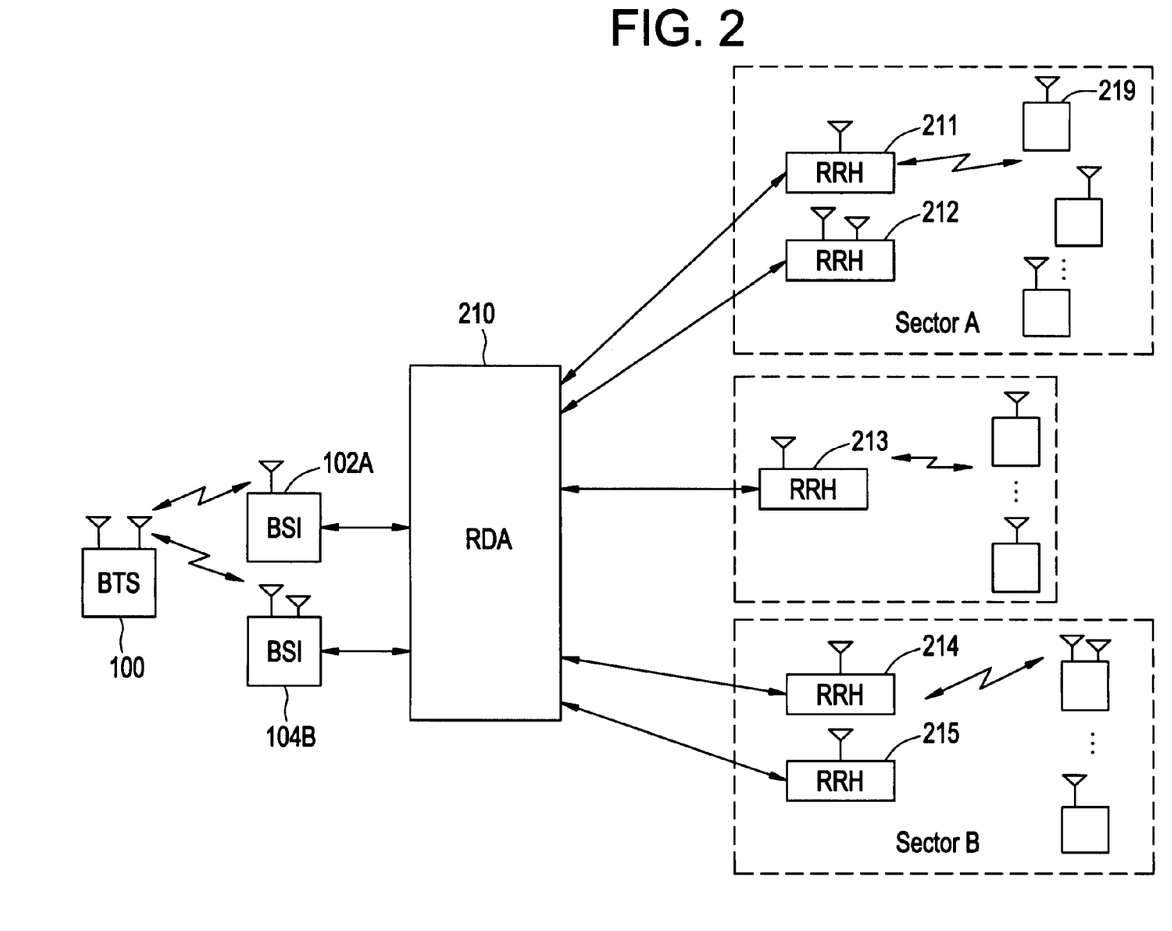
FIG. 2 illustrates an in-building radio network according to an example embodiment.

FIG. 2 shows an in-building communications network according to an example embodiment. In the network of FIG. 2, the base transceiver station (BTS) 100 may be the same as the BTS 10 discussed above with regard to FIG. 1. In addition, components of the in-building communications network shown in FIG. 2, other than the BTS 100, may have similar functionality to corresponding components in the network shown in FIG. 1. In addition, the components may have additional functionality as described herein.

Referring to FIG. 2, in one example embodiment, the BTS 100 may determine that sector reconfiguration is necessary, for example, based on load measurements associated with RRHs 211-215. Load measurements may be taken in any suitable manner. Although example embodiments will be described herein with regard to BTS 100 determining that sector reconfiguration is necessary, this determination may be made at a number of network elements, for example, base station interfaces (BSIs) 102A, 104B, radio distributor/aggregator (RDA) 210, and/or remote radio heads (RRHs) 211-215. In some instances, the RRHs may also be referred to as "radio transceivers."

Upon determining that sector re-configuration is necessary, the BTS 100 may initiate uplink and downlink transmission of weighted sum signals associated with each of sectors A and B. The uplink and downlink transmission of the weighted sum signals may continue for a time period referred to as a "transition period." The uplink and downlink transmission of the weighted sum signals may be initiated and/or performed with or without human intervention by a network operator.

According to example embodiments, the length of the transition period may be determined based on the time required for handoff to occur. As is well-known in the art, handoff may take on the order of a few hundred milliseconds. Consequently, the transition period may be at least on the order of seconds, for example.

Example embodiments will now be described in more detail with regard to FIGS. 2-5 and with regard to uplink and downlink communication taking place during the above-described transition period in which RRH 213 transitions from sector A to sector B. Accordingly, RRH 213 may be occasionally referred to herein as the transitioning RRH 213. Although example embodiments are described herein with regard to a single transitioning RRH 213, any number of RRHs may transition concurrently. Furthermore, in example embodiments, the terms "data packets," or "plurality of data packets," may be considered synonymous to and occasionally referred to as a "data packet stream."

Downlink Communication while Transitioning

Referring to FIG. 2, in the downlink (e.g., from BTS 100 to mobile units, such as mobile unit 219) wireless signals from BTS 100 are received at base station interfaces (BSIs) 102A and 104B. In one example, the BSI 102A may receive wireless signals from a first sector (or first antenna) of the BTS 100, whereas the BSI 104B may receive wireless signals from a second sector (or second antenna) of BTS 100.

The BSI 102A processes the received wireless signals to generate a downlink data signal intended for sector A (hereinafter referred to as a downlink sector A data signal).

The BSI 104B processes the received wireless signals to generate a downlink data signal intended for sector B (hereinafter referred to as a downlink sector B data signal).

The BSI 102A packetizes the downlink sector A data signal to generate data packets having destination addresses corresponding to sector A (hereinafter referred to as downlink sector A data packets). The BSI 102A transmits the downlink sector A data packets to a Radio Distributor/Aggregator (RDA) 210 over a high-speed data network (e.g., a Gigabit Ethernet network).

The BSI 104B packetizes the downlink sector B data signal to generate data packets having destination addresses corresponding to sector B (hereinafter referred to as downlink sector B data packets). The BSI 104B transmits the downlink sector B data packets to the RDA 210 over the high-speed data network.

The RDA 210 may transmit the downlink sector A data packets to RRHs 211 and 212 for transmission to mobile units in sector A, and may transmit the downlink sector B data packets to RRHs 214 and 215 for transmission to mobile units in sector B. The RDA 210 may also generate downlink weighted sum data packets including a downlink weighted sum signal based on the downlink sector A data packets and the downlink sector B data packets. The downlink weighted sum data packets may be transmitted to RRH 213 via the high-speed data network.

The RRHs 211-215 may process the received data packets in the same manner as the RRHs 111-115 described above.

Figure 3:
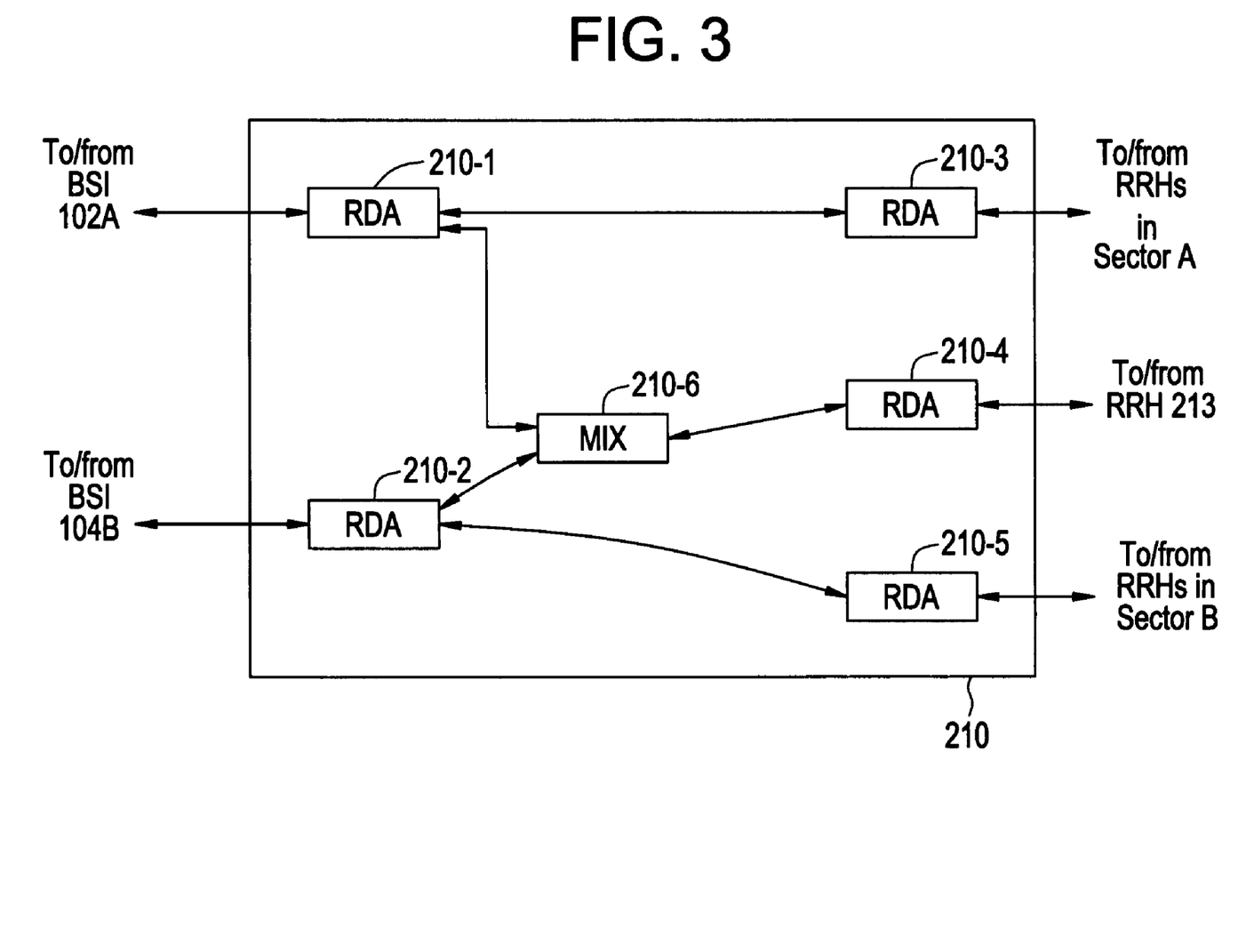
FIG. 3 illustrates a functional block diagram of an radio distributor/aggregator (RDA) according to an example embodiment.

FIG. 3 illustrates a functional block diagram of the RDA 210 in more detail. As shown, the RDA 210 may include a plurality of RDA modules 210-1-210-5 and a mixing module 210-6.

Referring to FIGS. 2 and 3, the downlink sector A data packets from BSI 102A may be input to RDA module 210-1, and the downlink sector B data packets from BSI 104B may be input to RDA module 210-2.

The RDA module 210-1 may replicate the downlink sector A data packets on a packet-by-packet basis, and forward a first copy of each replicated downlink sector A data packet to the RDA module 210-3. The RDA module 210-1 may process a second copy of each downlink sector A data packet to recover the downlink sector A data signal. The RDA module 210-1 may forward the recovered downlink sector A data signal to mixing module 210-6.

Similar to the RDA module 210-1, the RDA module 210-2 may replicate the downlink sector B data packets on a packet-by-packet basis, and forward a first copy of each downlink sector B data packet to the RDA module 210-5. The RDA module 210-2 may process a second copy of each downlink sector B data packet to recover the downlink sector B data signal. The RDA module 210-2 may forward the recovered downlink sector B data signal to mixing module 210-6.

Although discussed herein as being performed on a packet-by-packet basis, the RDA modules 210-1 and 210-2 may also utilize a buffer. For example, the RDA module 210-1 may buffer the received downlink sector A data packets before replicating and processing.

Referring still to FIG. 3, the RDA module 210-3 transmits the downlink sector A data packets to associated RRHs 211 and 212 via the high-speed data network. The RRHs 211 and 212 may buffer the received downlink sector A data packets to remove jitter. The RRHs 211 and 212 may process the buffered downlink sector A data packets to obtain the downlink sector A data signal and transmit the downlink sector A data signal to users in the same manner as the RRHs 111 and 112 shown in FIG. 1.

Similar to the RDA module 210-3, the RDA module 210-5 transmits the downlink sector B data packets to associated RRHs 214 and 215 via the high-speed data network. The RRHs 214 and 215 may buffer the received downlink sector B data packets to remove jitter. The RRHs 214 and 215 may process the buffered downlink sector B data packets to obtain the downlink sector B data signal and transmit the downlink sector B data signal to users in the same manner as the RRHs 114 and 115 shown in FIG. 1.

Still referring to FIG. 3, the mixing module 210-6 generates a downlink weighted sum data signal based on the downlink sector A data signal and the downlink sector B data signal. The downlink weighted sum data signal is output to RDA module 210-4. The RDA module 210-4 corresponds to RRH 213 transitioning from sector A to sector B. The RDA module 210-4 buffers and packetizes the downlink weighted sum data signal to generate downlink weighted sum data packets. The RDA module 210-4 may buffer and packetize the downlink weighted sum data signal using the same or substantially the same processes as the BSIs 102A and 104B. The RDA 210-4 may transmit the weighted sum data packets to the RRH 213 via the high-speed data network.

The RRH 213 may buffer and process the weighted sum data packets in the same manner as the RRHs 211, 212, 214 and/or 215 as discussed above and broadcast the obtained weighted sum data signal to associated mobile units over the air via an antenna.

A more detailed example downlink operation at the mixing module 210-6 will be described with regard to FIG. 4, which illustrates the mixing module 210-6 in more detail.

Figure 4:
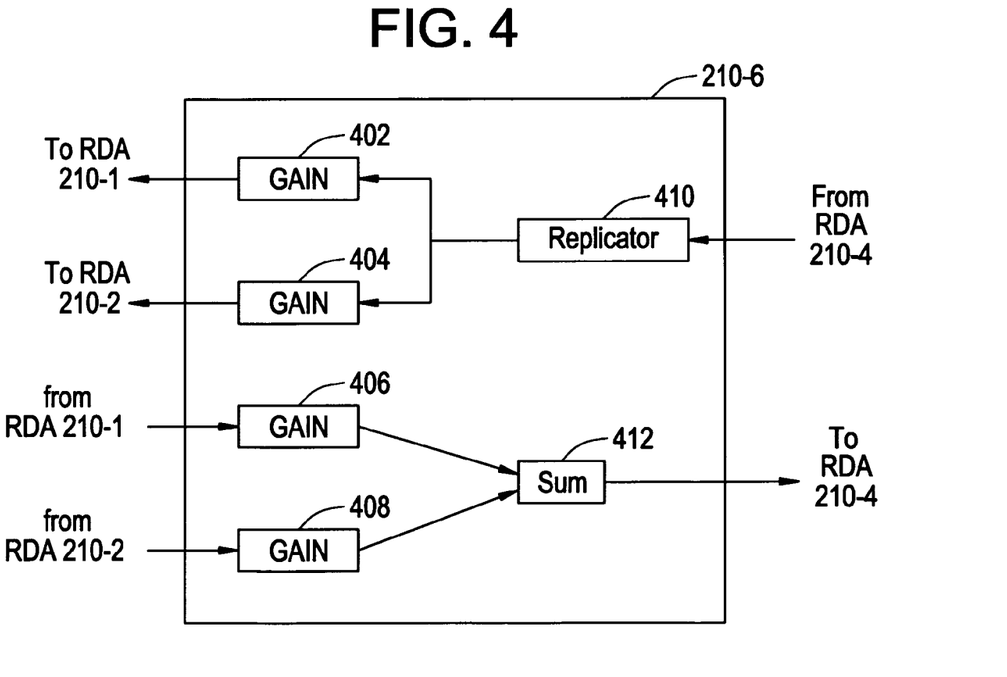
FIG. 4 is a more detailed functional block diagram of a mixing module according to an example embodiment.

Referring to FIG. 4, the mixing module 210-6 may include downlink gain modules 406, 408 and summer 412. Although only two gain modules are shown in FIG. 4, the mixing module 210-6 may include any number of gain modules.

In accordance with the above-discussed example, the downlink sector A data signal from RDA 210-1 may be input to gain module 406, whereas the downlink sector B data signal from RDA module 210-2 may be input to gain module 408.

The gain module 406 may scale the downlink sector A data signal with a first gain parameter and output the gain adjusted (or weighted) sector A data signal to the summer 410. Similarly, the gain module 408 may scale the downlink sector B data signal with a second gain parameter and output the gain adjusted (or weighted) sector B data signal to the summer 410.

The summer 412 sums (or combines) the weighted sector A and sector B data signals to generate resultant weighted sum data signal. The weighted sector A and sector B data signals may be combined in any well-known manner.

According to example embodiments, the first and second gain parameters may be adjusted (e.g., smoothly adjusted) over time during the transition period. That is, for example, during the transition period, the first gain parameter and the second gain parameter may be adjusted such that the strength of downlink sector A data signal decreases, whereas the strength of downlink sector B data signal increases. That is, for example, the first weight or gain parameter applied by gain module 406 may be gradually decreased from a first (e.g., maximum) value to a second (e.g., minimum) value over time during the transition period, while the second weight or gain applied by the gain module 408 may gradually increase from a third (e.g., minimum) value to a fourth (e.g., maximum) value over time during the transition period. The slope of the first and second gain parameters may be linear with time or log linear with time (e.g., with cutoff).

In at least one example embodiment, the first and fourth values may be equal, and the second and third values may be equal.

Figure 5:
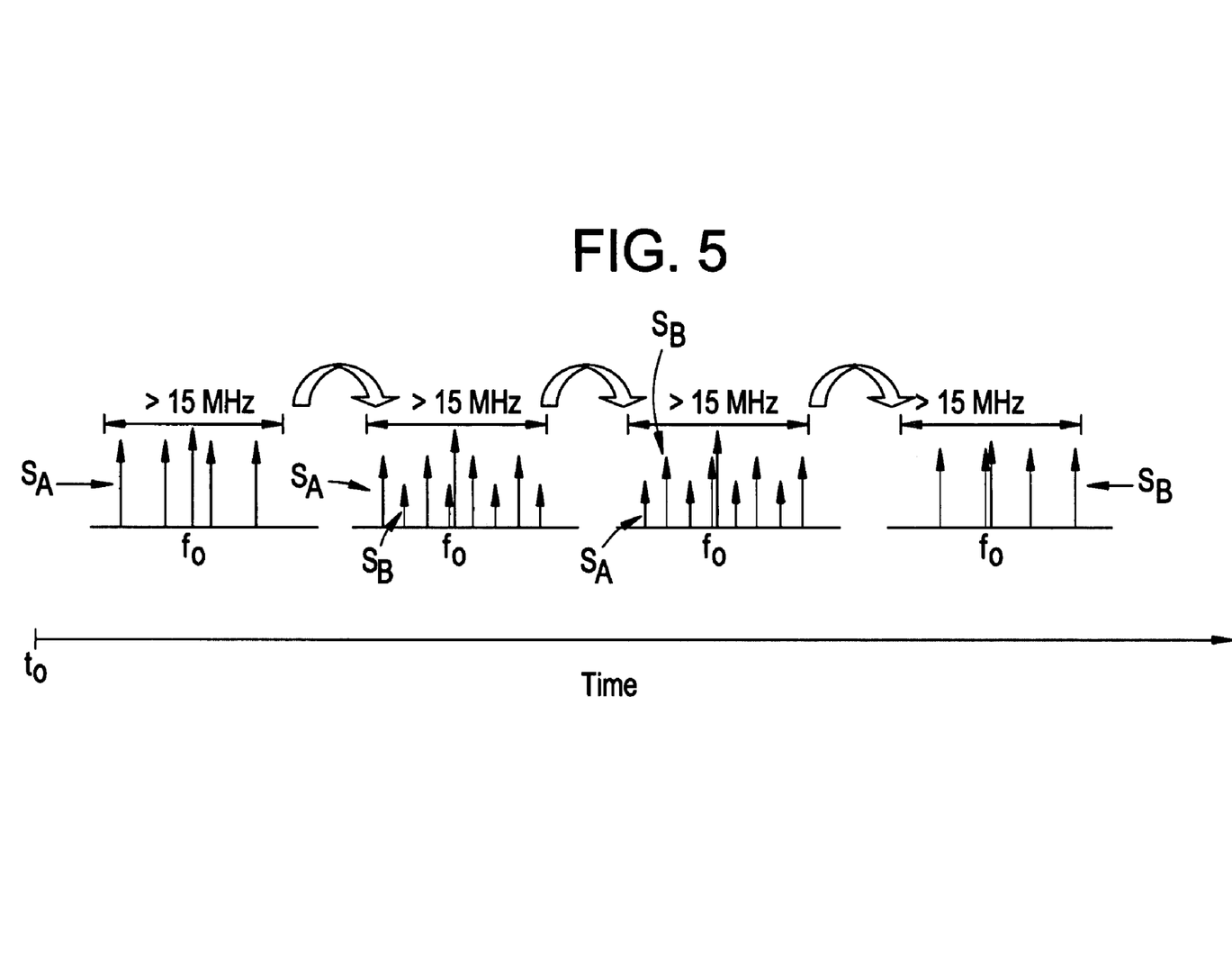
FIG. 5 illustrates an example output spectrum of RRHs supporting GSM air-interface during an example sector boundary transition operation.

FIG. 5 illustrates a more specific example output spectrum of, for example, RRH 213 (supporting a GSM air-interface) during a transition period.

Referring to FIG. 5, the arrows labeled $S_A$ represent carriers from sector A, and the arrows labeled $S_B$ represent carriers from sector B in FIG. 2. The positions of the arrows $S_A$ and $S_B$ indicate the carrier frequencies and the heights of the arrows indicate the carrier (or signal) strengths. Referring back to FIG. 2, for example, as RRH 213 transitions from sector A to sector B, the carrier strengths of the data signal associated with sector A (e.g., the arrows $S_A$ in FIG. 5) decrease according to time (which progresses from left to right in FIG. 5), while the carrier strengths of the data signals associated with sector B (e.g., the arrows $S_B$ in FIG. 5) increase according to time.

Uplink Communication while Transitioning

Referring back to FIG. 3, an example uplink communication between mobile units and BTS 100 during a transition period in which RRH 213 transitions from sector A to sector B will be described.

In this uplink communication example, RRHs 211-212 receive data signals transmitted from mobile units in sector A (hereinafter referred to as uplink sector A data signals). The RRHs 214-215 receive data signals transmitted from mobile units in sector B (hereinafter referred to as uplink sector B data signals).

Each of RRHs 211 and 212 combine received uplink sector A data signals to generate a resultant uplink sector A data signal. At each of RRHs 211 and 212, the resultant uplink sector A data signal is buffered and packetized in the same manner as discussed above with regard to the conventional art to generate uplink sector A data packets. The RRHs 211 and 212 transmit the uplink sector A data packets to corresponding RDA module 210-3 via the high-speed data network. The RDA module 210-3 buffers and processes the received uplink sector A data packets to recover the resultant uplink sector A data signals from each of RRHs 211 and 212. The RDA module 210-3 combines the recovered resultant uplink sector A data signals to generate a second resultant uplink sector A data signal. The RDA module 210-3 forwards the second resultant uplink sector A data signal to RDA module 210-1.

Each of RRHs 214 and 215 combine received uplink sector B data signals to generate a resultant uplink sector B data signal. At each of RRHs 214 and 215, the resultant uplink sector B data signal is buffered and packetized in the same manner as discussed above with regard to the conventional art to generate uplink sector B data packets. The RRHs 214 and 215 transmit the uplink sector B data packets to corresponding RDA module 210-5 via the high-speed data network. The RDA module 210-5 buffers and processes the received uplink sector B data packets to recover the resultant uplink sector B data signals from each of RRHs 214 and 215. The RDA module 210-5 combines the recovered resultant uplink sector B data signals to generate a second resultant uplink sector B data signal. The RDA module 210-5 forwards the second resultant uplink sector B data signal to RDA module 210-2.

As noted above, during the transition period, the RRH 213 is transitioning from sector A to sector B. Regardless, however, the RRH 213 continues to receive data signals transmitted by mobile units under its coverage before, during or after the transition. Before the transition, the data signals are combined into an uplink signal for sector A (e.g., at RDA module 210). After the transition, the signals are combined into an uplink signal for sector B (e.g., at RDA 210). During the transition period, the data signals are combined into uplink signals of both sectors A and B with a varying weight (e.g., at RDA 210). For the sake of clarity, data signals received from users being served by RRH 213 will be referred to herein as uplink sector A-B data signals.

Still referring to FIG. 3, the RRH 213 combines the uplink sector A-B data signals to generate a resultant uplink sector A-B data signal. The resultant uplink sector A-B data signal is then buffered and packetized in the same manner as discussed above with regard to the conventional art to generate uplink sector A-B data packets. The RRH 213 transmits the uplink sector A-B data packets to corresponding RDA module 210-4 via the high-speed data network.

The RDA module 210-4 processes the received uplink sector A-B data packets to recover the resultant uplink sector A-B data signal, for example, on a packet-by-packet basis. The recovered resultant uplink sector A-B data signal is forwarded to the mix module 210-6.

The mix module 210-6 replicates and gain adjusts the resultant uplink sector A-B data signal to generate a weighted sector A-B data signal to be output to each of RDA modules 210-1 and 210-2. The mixing module 210-6 then outputs the weighted sector A-B data signals to RDAs 210-1 and 210-2, concurrently. A more specific example of a manner in which the mixing module 210-6 generates the weighted sector A-B data signal will be described with regard to FIG. 4. As discussed above, FIG. 4 is a more detailed illustration of the mixing module 210-6 in FIG. 3.

Referring again to FIG. 4, in addition to the downlink components, the mixing module 210-6 may include replicator 410 and uplink gain modules 402 and 404.

In this example, the resultant uplink sector A-B data signal from RDA module 210-4 may be replicated at replicator 410 to generate a first uplink sector A-B data signal intended for BSI 102A and a second uplink sector A-B data signal intended for BSI 104B. The first uplink sector A-B data signal and the second uplink sector A-B data signal may be the same signal. The first uplink sector A-B data signal may be output to uplink gain module 402, whereas the second uplink sector A-B data signal may be output to uplink gain module 404.

Uplink gain module 402 may gain adjust or weight the first uplink sector A-B data signal using the above-described first gain parameter. Uplink gain module 404 may gain adjust or weight the second uplink sector A-B data signal using the above-described second gain parameter. The uplink gain modules 402 and 404 may gain adjust respective first and second uplink sector A-B data signals in the same or substantially the same manner as the downlink gain modules 406 and 408 described above. Because the first and second gain parameters may be the same or substantially the same as the first and second gain parameters discussed above with regard to the downlink, a detailed discussion will be omitted for the sake of brevity. In addition, because the uplink gain modules 402 and 404 may operate in the same or substantially the same manner as the downlink gain modules 406 and 408, a detailed discussion will also be omitted for the sake of brevity.

Still referring to FIG. 4, the weighted first uplink sector A-B data signal may be output to RDA module 210-1, while the weighted second uplink sector A-B data signal may be output to RDA module 210-2.

Referring back to FIG. 3, the RDA module 210-1 may buffer and combine the resultant uplink sector A data signal from RDA module 210-3 with the weighted first sector A-B data signal in any well-known manner (treating the weighted first sector A-B data signal as an uplink sector A data signal) to generate a first weighted uplink data signal. The RDA module 210-1 may then packetize the first weighted uplink data signal and output the resultant data packets to BSI 102A via the high-speed data network. The BSI 102A processes the received data packets to recover the first weighted uplink data signal, and transmits the first weighted uplink data signal to the BTS 100 in the same manner as the BSI 12A.

The RDA module 210-2 may buffer and combine the resultant uplink sector B data signal from RDA module 210-5 with the weighted second sector A-B data signal in any well-known manner (treating the weighted second sector A-B data signal as an uplink sector B data signal) to generate a second weighted uplink data signal. The RDA module 210-2 may then packetize the second weighted uplink data signal and output the resultant data packets to BSI 104B via the high-speed data network. The BSI 104B may process the received data packets to recover the second weighted uplink data signal, and transmits the second weighted uplink data signal to the BTS 100 in the same manner as the BSI 14B.

The above-described uplink and downlink transmission operations including the mixing module 210-6 may continue until the transition period ends. At the end of the transition period, the mixing operations performed by the mixing module 210-6 may be omitted.

Figure 6:
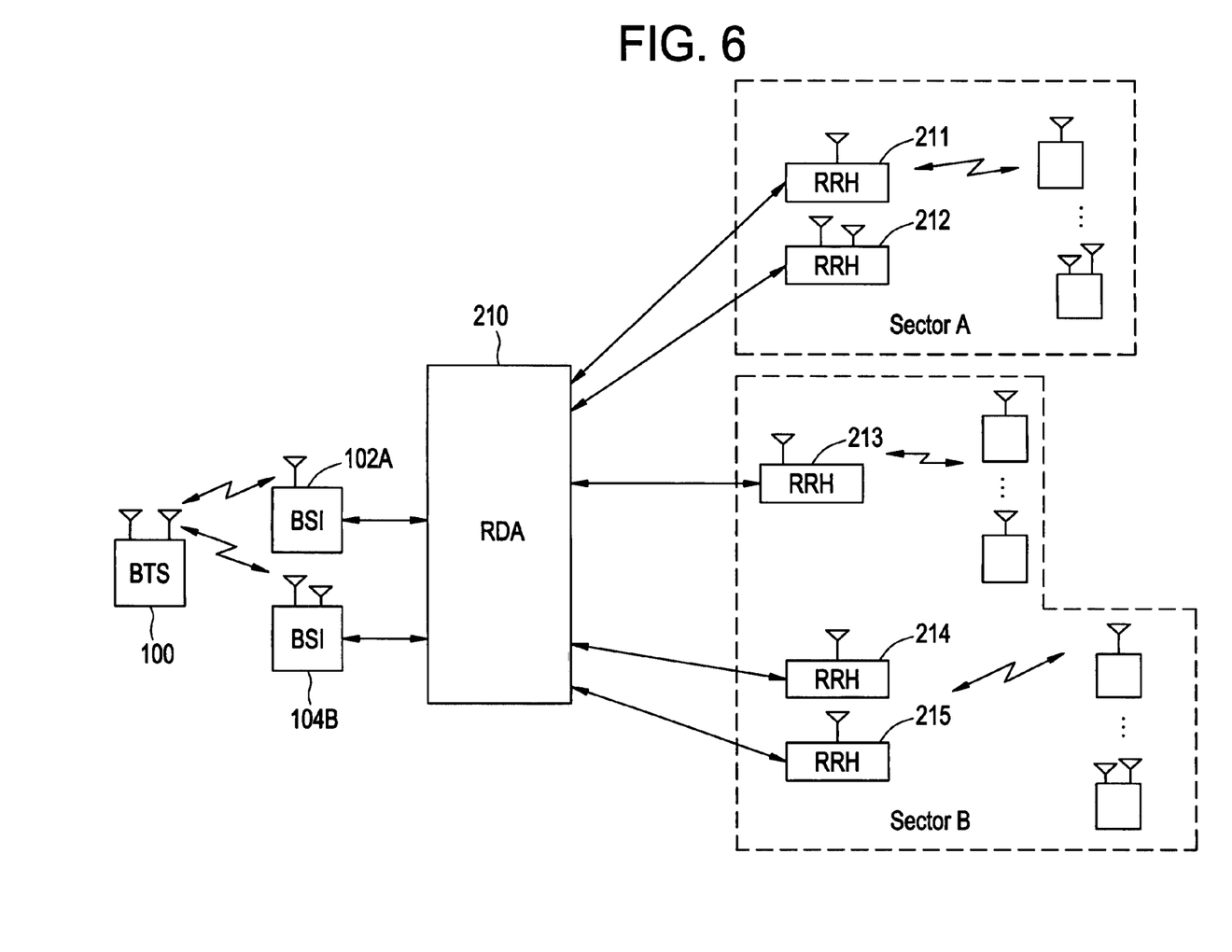
FIG. 6 illustrates in-building communications network according to an example embodiment after performing sector reconfiguration.

For the sake of clarity, FIG. 6 illustrates the network of FIG. 2 after RRH 213 has transitioned from sector A to sector B. Referring to FIGS. 5 and 6, FIG. 6 illustrates a sector configuration corresponding to the right side of FIG. 5 in which carrier strengths of signals from sector A are zero (or nulled), whereas carrier strengths of signals from sector B are at a maximum (e.g., 100% carrier strengths of signals to/from sector B are transmitted/received).

Although FIG. 4 shows a particular example embodiment in which RDA 210 includes a plurality of RDA modules and the RRHs and BSIs are separate there from, other physical implementations are possible. For example, a RRH may implement only a RRH function or may include an RRH and a RDA function. A BSI may implement a BSI function or may include a BSI function and a mix function. An RDA may implement only the distribution of the signals, or a RDA function including uplink and/or downlink combining.

When a network according to example embodiments supports CDMA/UMTS air-interface, sectors A and B may operate at the same frequency with the same bandwidth. The downlink signal formed by the mix module 210-6 may also be at the same frequency and with the same bandwidth. Thus, additional capability is not required on the RRHs to support this feature. Likewise, on the uplink, the BSIs need not be modified to support this feature.

For TDMA air-interfaces such as GSM, sectors A and B may use a different set of carriers. When signals from sectors A and B are combined, the resultant signal contains more carriers than either of the original signals. If example embodiments are implemented in such a way, where the full bandwidth over which the base stations operate is transported and transmitted at the RRHs, the system need not be concerned how many carriers are actually within the supported bandwidth. The mix function may operate the same way as described previously.

According to example embodiments, the weighted sum function may be performed within the RDA or at the BSIs (e.g., if the base station interfaces for both sectors are physically integrated on the same circuit board). If performed at the BSI, a new virtual LAN may be created to carry the resultant uplink and downlink signals. The transitioning RRHs may be assigned to the new virtual LAN to transmit and receive the resultant signals.

The invention being thus described, it will be obvious that the same may be varied in many ways. Such variations are not to be regarded as a departure from the invention, and all such modifications are intended to be included within the scope of the invention.

We claim:

1. A method for configuring sectors of an in-building wireless communication network, the method comprising:
    transitioning at least one in-building radio transceiver from a first sector to a second sector, the transitioning step being performed during a transition period in which the at least one radio transceiver transmits a weighted sum of a first data signal and a second data signal, and at a start of the transition period the signal strength of the first data signal is greater than the signal strength of the second data signal, the first data signal being associated with the first sector and the second data signal being associated with the second sector, the weighted sum varying such that, during the transition period, a signal strength of the first data signal decreases and a signal strength of the second data signal increases; the transitioning further including,
    applying a first weight to the first data signal, the first weight gradually decreasing from a first value to a second value during the transition period,
    applying a second weight to the second data signal, the second weight gradually increasing from the second value to the first value during the transition period,
    combining the weighted first and second data signals to generate the weighted sum of the first data signal and the second data signal, and
    transmitting the weighted sum of the first data signal and the second data signal to the at least one radio transceiver.

2. The method of claim 1, wherein at an end of the transition period, the signal strength of the first data signal is less than the signal strength of the second data signal.

3. The method of claim 2, wherein at the end of the transition period, the signal strength of the first data signal is nulled.

4. A method for configuring sectors of a wireless communication network by transitioning at least one radio transceiver from a first sector to a second sector, the method comprising:
    transmitting, by the at least one radio transceiver, a weighted sum of a first data signal and a second data signal, the first data signal being associated with a first sector of a wireless network and the second data signal being associated with a second sector of a wireless network, the weighted sum varying such that, during a transition period, a signal strength of the first data signal decreases and a signal strength of the second data signal increases, and at a start of the transition period the signal strength of the first data signal is greater than the signal strength of the second data signal;
    applying a first weight to the first data signal, the first weight gradually decreasing from a first value to a second value during the transition period;
    applying a second weight to the second data signal, the second weight gradually increasing from the second value to the first value during the transition period; and
    combining the weighted first and second data signals to generate the weighted sum of a first data signal and a second data signal.

5. The method of claim 4, wherein at an end of the transition period, the signal strength of the first data signal is less than the signal strength of the second data signal.

6. The method of claim 5, wherein at the end of the transition period, the first data signal is nulled.

7. A method for configuring sectors of a wireless communication network by transitioning a first radio transceiver from a first sector to a second sector, the method comprising:

first combining a first weighted data signal and a first data signal to generate a first resultant weighted signal, the first weighted data signal being associated with a transitioning radio transceiver, the first data signal being associated with a first radio transceiver, and the first weighted data signal being adjusted with a first weight, which gradually decreases during a transition period;

second combining a second weighted data signal with a second data signal to generate a second resultant weighted signal, the second weighted data signal being associated with the transitioning radio transceiver, the second data signal being associated with a second radio transceiver, and at a start of the transition period, a signal strength of the first weighted data signal is greater than a signal strength of the second weighted data signal, and the second weighted data signal being adjusted with a second weight, which gradually increases during the transition period;

transmitting the first and second resultant weighted signals until the transitioning radio transceiver transitions from the first sector to the second sector; and replicating a first data signal received from a first radio transceiver to generate a first replicated data signal and a second replicated data signal;

first generating the first weighted data signal based on the first replicated data signal and a first gain parameter; and second generating the second weighted data signal based on the second replicated data signal and a second gain parameter.

8. The method of claim 7, wherein the first generating step further comprises:

gain adjusting the first replicated data signal using the first gain parameter.

9. The method of claim 8, wherein the first gain parameter increases or decreases over time during the transition period.

10. The method of claim 8, wherein at an end of the transition period, the first a first weighted data signal is nulled.

11. The method of claim 7, wherein the second generating step further comprises:

gain adjusting the second replicated data signal using the second gain parameter.

12. The method of claim 11, wherein the second gain parameter increases or decreases over time during the transition period.

13. The method of claim 7, wherein at an end of the transition period, a signal strength of the first weighted data signal is less than a signal strength of the second weighted data signal.

* * * * *